United States Patent
Hsieh et al.

(10) Patent No.: US 8,493,729 B2
(45) Date of Patent: Jul. 23, 2013

(54) COMPUTER CHASSIS WITH HARD DISK DRAWERS

(75) Inventors: Chung-Cheng Hsieh, New Taipei (TW); Li-Ping Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 210 days.

(21) Appl. No.: 13/214,252

(22) Filed: Aug. 22, 2011

(65) Prior Publication Data
US 2012/0314362 A1 Dec. 13, 2012

(30) Foreign Application Priority Data
Jun. 9, 2011 (TW) .................................. 100120227

(51) Int. Cl.
*H05K 5/00* (2006.01)

(52) U.S. Cl.
USPC ............ 361/679.39; 361/679.38; 361/679.35; 720/638; 312/223.2

(58) Field of Classification Search
None
See application file for complete search history.

(56) References Cited

U.S. PATENT DOCUMENTS

| | | | | |
|---|---|---|---|---|
| 3,759,475 A | * | 9/1973 | Brown | 248/277.1 |
| 4,254,679 A | * | 3/1981 | Mathey | 83/575 |
| 4,838,586 A | * | 6/1989 | Henne | 292/113 |
| 6,519,160 B1 | * | 2/2003 | Branch et al. | 361/754 |
| 8,214,000 B2 | * | 7/2012 | Hwang et al. | 455/575.1 |
| 2004/0027335 A1 | * | 2/2004 | Lin | 345/168 |
| 2004/0036390 A1 | * | 2/2004 | Woo | 312/334.3 |
| 2005/0231906 A1 | * | 10/2005 | Deckers et al. | 361/685 |
| 2005/0257232 A1 | * | 11/2005 | Hidaka | 720/654 |
| 2007/0035922 A1 | * | 2/2007 | Jiang et al. | 361/685 |
| 2007/0169523 A1 | * | 7/2007 | Lu | 70/58 |
| 2008/0062635 A1 | * | 3/2008 | Chang | 361/685 |
| 2011/0051356 A1 | * | 3/2011 | Yang et al. | 361/679.39 |

* cited by examiner

*Primary Examiner* — Adrian S Wilson
*Assistant Examiner* — Abhishek Rathod
(74) *Attorney, Agent, or Firm* — Altis Law Group, Inc.

(57) ABSTRACT

A computer chassis is provided. The computer chassis includes a housing, an elastic element, a scissor structure fixed to the housing, and two hard disk drawers slidably connected to the housing and capable of being drawn out from the housing. The scissor is set between the two hard disk drawers. When both of the two hard disk drawers are not drawn out, the scissor structure is sandwiched between the two adjacent hard disk drawers, and the elastic element is deformed. When one of the two hard disk drawer is drawn out, the scissor structure engages the hard disk drawer being not drawn out under the elastic force generated by the elastic element.

6 Claims, 5 Drawing Sheets

COMPUTER CHASSIS WITH HARD DISK DRAWERS

BACKGROUND

1. Technical Field

The present disclosure relates to a computer chassis with hard disk drawers.

2. Description of Related Art

With the development of electronic technology, one hard disk cannot satisfy all the requirements of an user. When a number of hard disks are installed in a computer chassis, hard disk drawers are often needed to place the hard disks. If the computer chassis includes a number of hard disk drawers, when all the hard disk drawers are drawn out, the gravitational center of the computer chassis will incline forward, and may result in the computer chassis toppling over.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
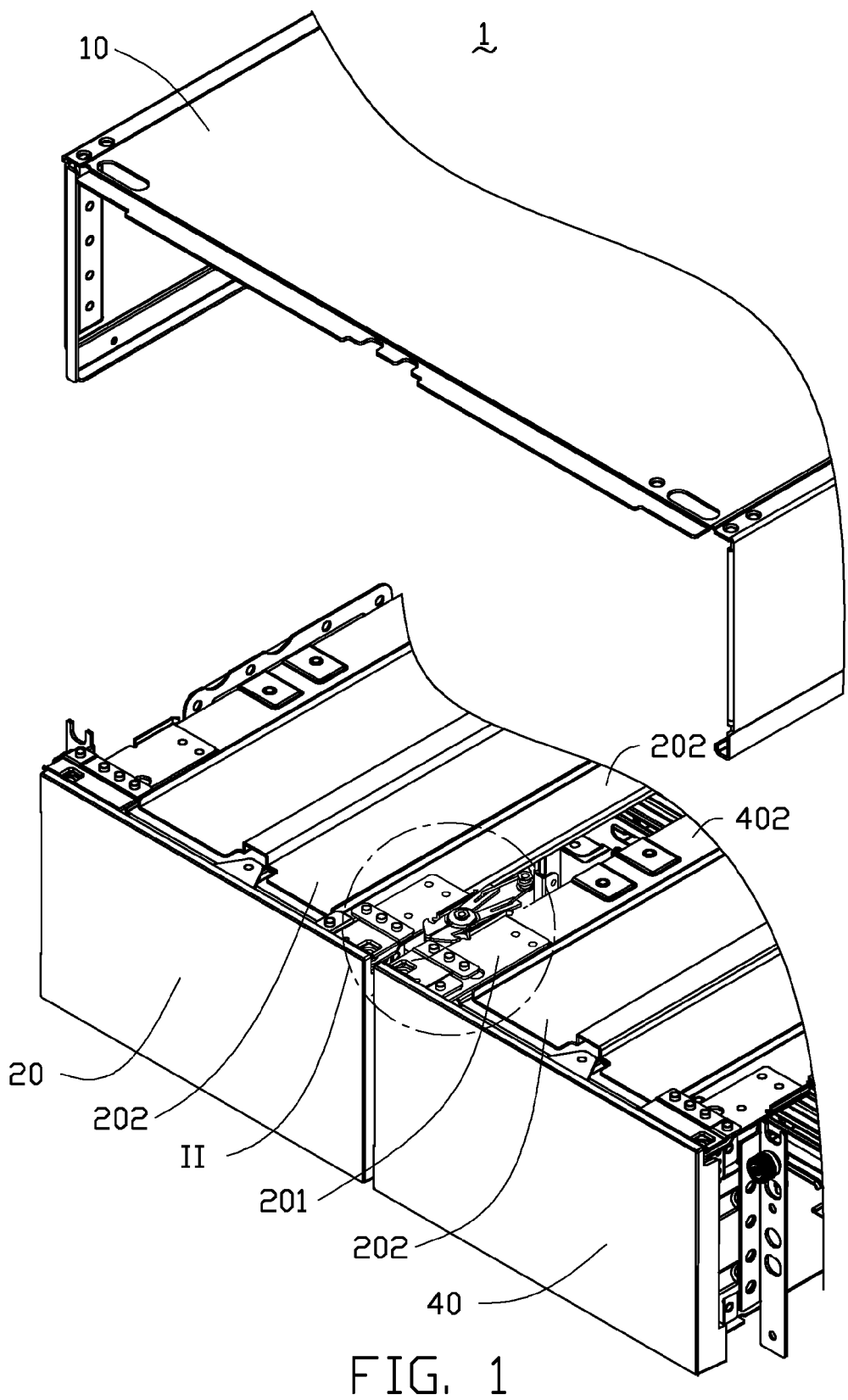
FIG. 1 a partial, isometric view of a computer chassis when none of hard disk drawers of the computer chassis are drawn out, in accordance with an exemplary embodiment.
Figure 2:
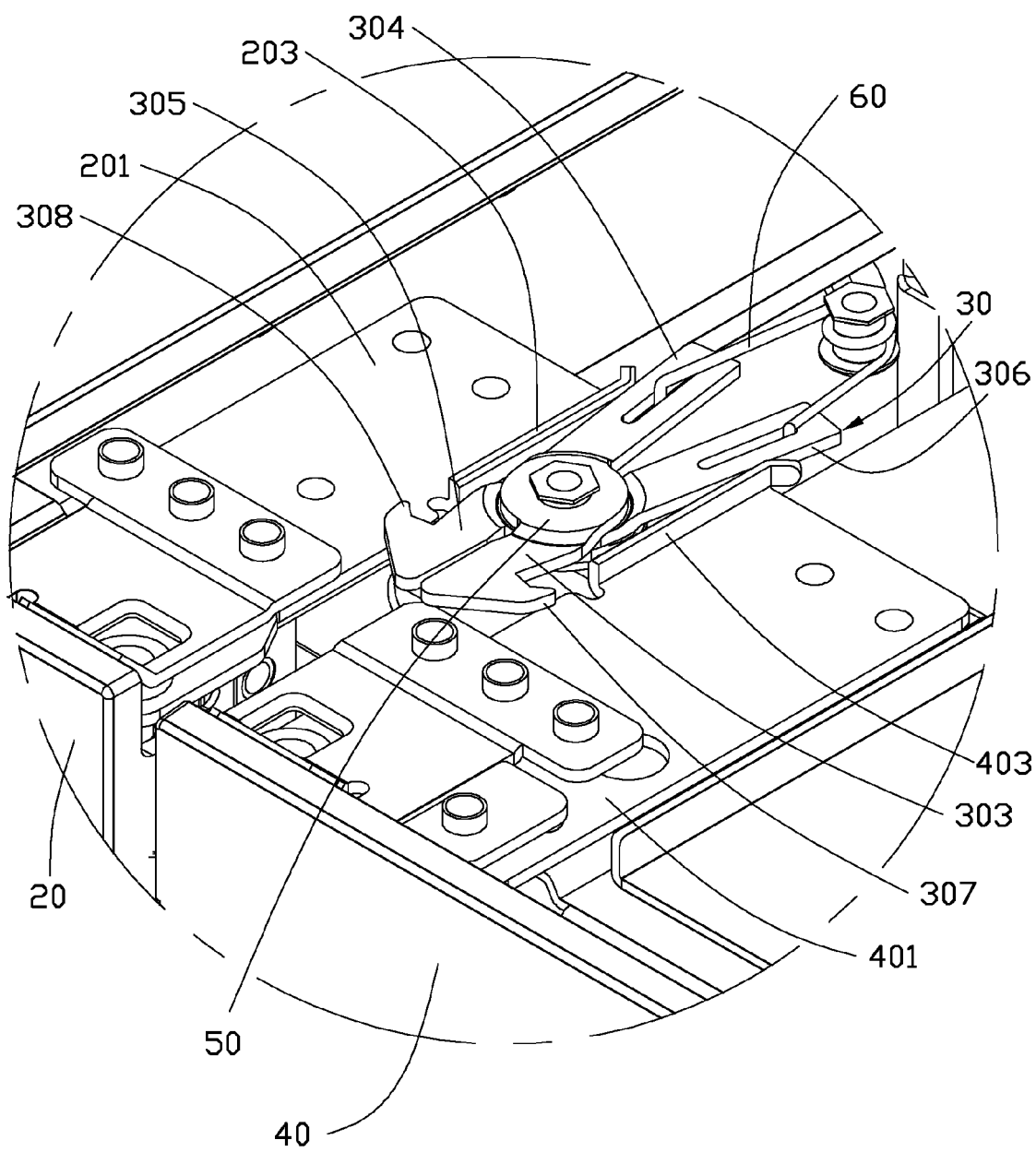
FIG. 2 is an enlarged view of a scissor structure of encircled portion II of the computer chassis of FIG. 1.
Figure 3:
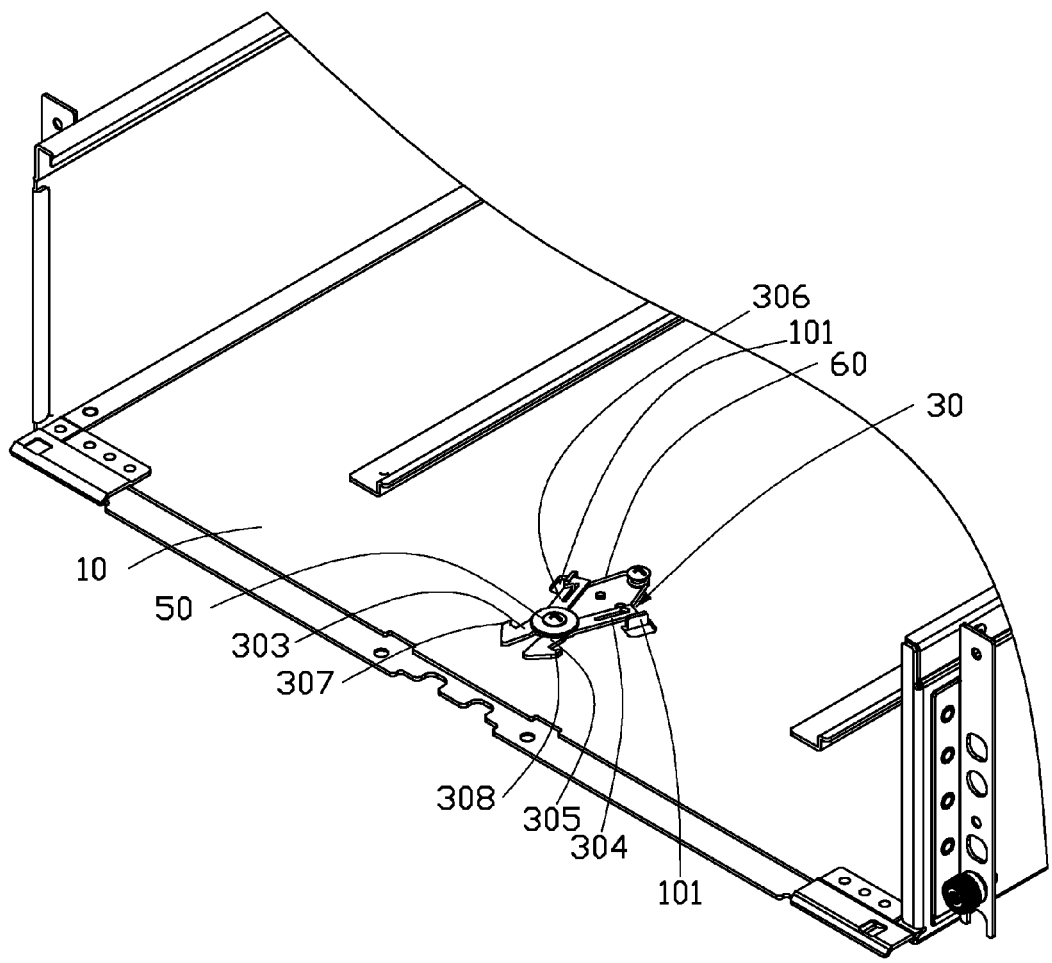
FIG. 3 is a partial, isometric view of the scissor structure fixed to a housing of the computer chassis of FIG. 1.

Referring to FIGS. 1-3, a computer chassis 1 includes a housing 10 and at least two hard disk drawers. Each of the at least two hard disk drawers holds a number of hard disks (not shown). In the present embodiment, two hard disk drawers, namely a first hard disk drawer 20 and a second hard disk drawer 40, are used as example to describe an embodiment.

The first hard disk drawer 20 and the second hard disk drawers 40 are slidably connected to the housing 10 and can be drawn out from the housing 10.

A scissor structure 30 is fixed to the housing 10. The scissor structure 30 includes a first arm 303, a second arm 304, a third arm 305, and a fourth arm 306. The first arm 303 and the second arm 304 are an integral structure. The third arm 305 and the fourth arm 306 are an integral structure. The first arm 303 and the second arm 304, and the third arm 305 and the fourth arm 306 can rotate around an axis 50 fixed in the housing 10. The scissor structure 30 fixes to the housing 10 at the position where the axis 50 located.

A free end of the first arm 303 defines a wedge-shaped first stopper 307. A free end of the third arm 305 defines a wedge-shaped second stopper 308. A free end of the fourth arm 306 and a free end of the second arm 304 are respectively connected to two free ends of an elastic element 60. The elastic element 60 is fixed to the housing 10. In the present embodiment, the elastic element 60 is a torsion spring. The housing 10 further includes two protrusions 101. The two protrusions 101 are located outside of the second arm 304 and the fourth arm 306 respectively to limit the movement of the second arm 304 and the fourth arm 306.

The first hard disk drawer 20 includes a first resisting element 203. The second hard disk drawer 40 includes a second resisting element 403. The first resisting element 203 protrudes from a body 201 of the first hard disk drawer 20. The second resisting element 403 protrudes from a body 401 of the second hard disk drawer 40. When both of the first hard disk drawer 20 and the second hard disk drawer 40 are not drawn out, the second resisting element 403 contacts the fourth arm 306, the first resisting element 203 contacts the second arm 304, causing the elastic element 60 to be deformed, the first stopper 307 does not contact with the second resisting element 403 and the second stopper 308 does not contact with the first resisting element 203.

Figure 4:
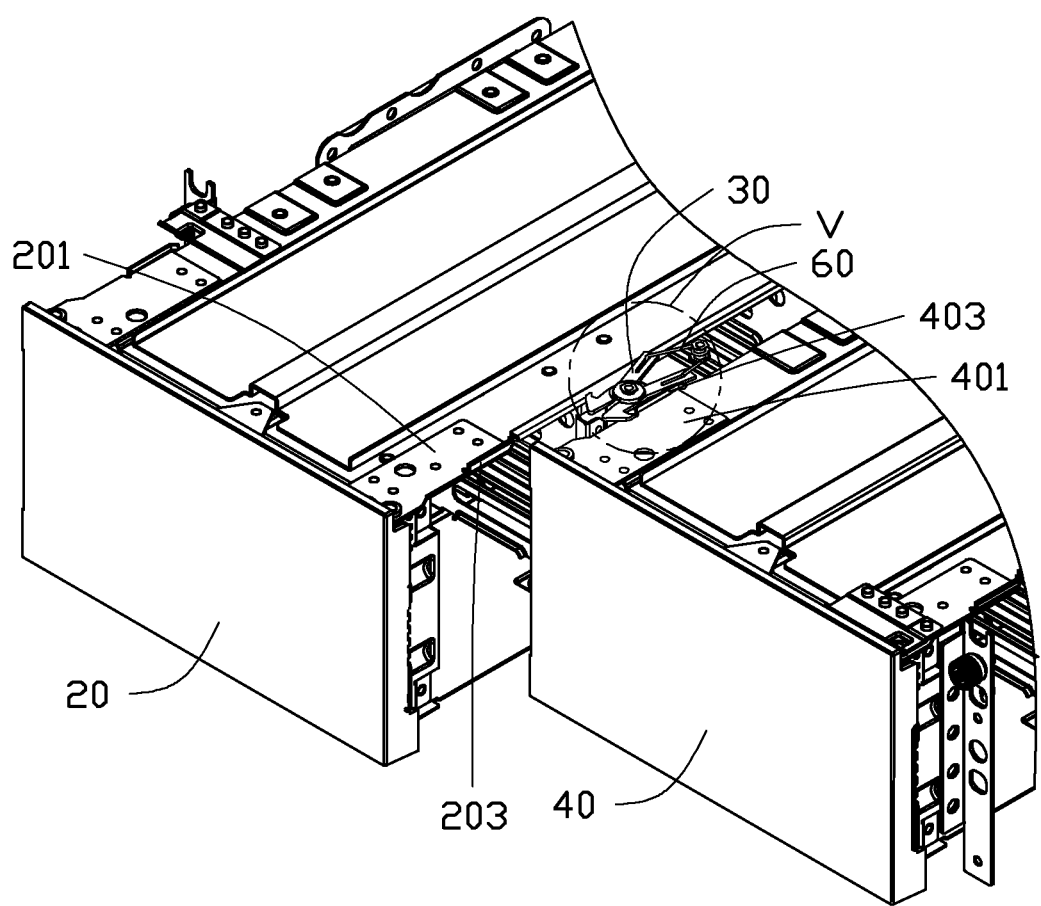
FIG. 4 is a partial, isometric view of the computer chassis of FIG. 1 when one of the hard disk drawers of the computer chassis is drawn out.
Figure 5:
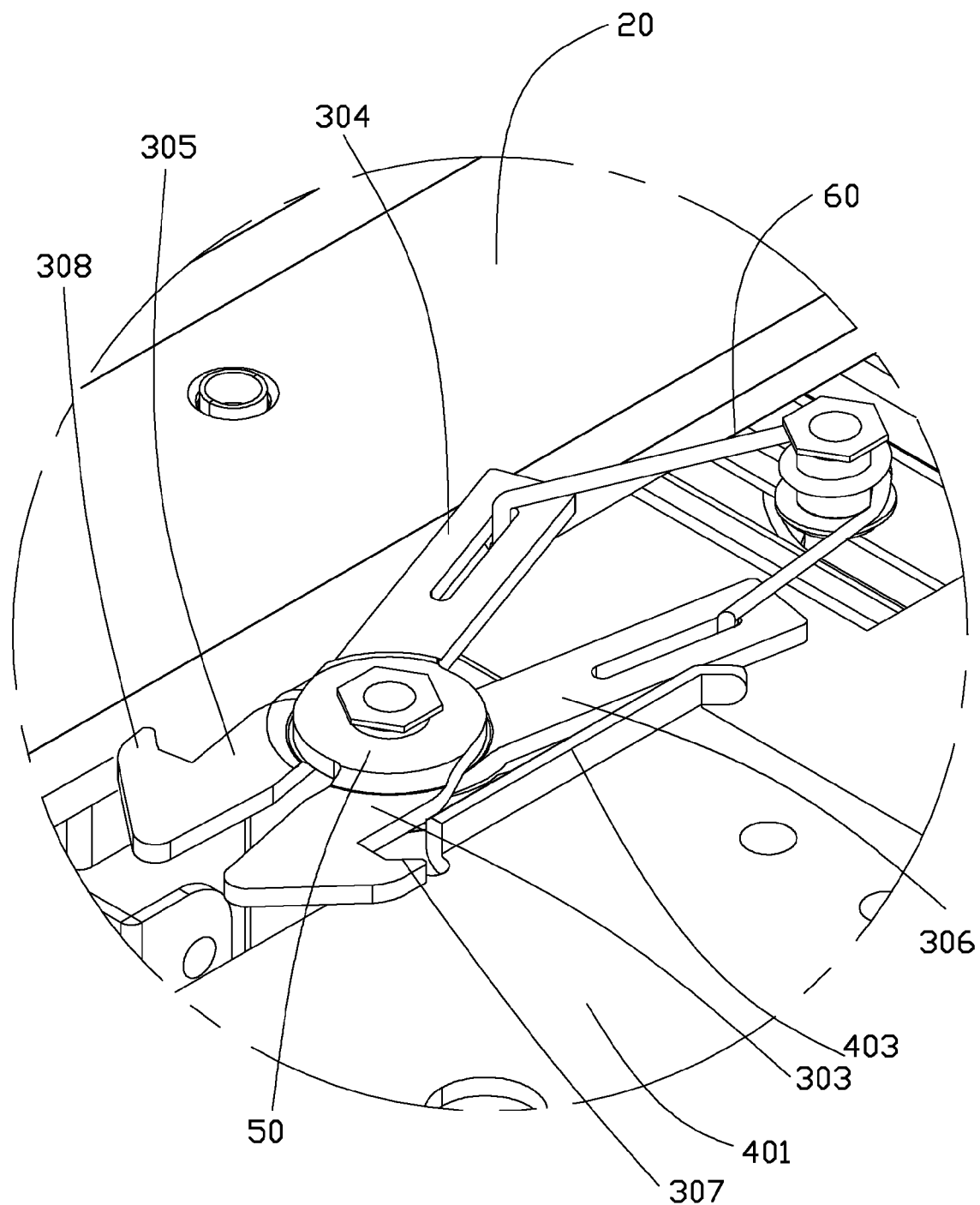
FIG. 5 is an enlarged view of the scissor structure of encircled portion V of the computer chassis of FIG. 4.

Referring to FIG. 4-5, when the first hard disk drawer 20 is drawn out, the first resisting element 203 moves along the movement of the first hard disk drawer 20 to release one free end of the deformed elastic element 60. Thereby, the second arm 304 rotates around the axis 50 under the elastic force generated by the elastic element 60. The first arm 303 also rotates around the axis 50 to make the first stopper 307 engage with the second resisting element 403. Thus, when the first hard disk drawer 20 is drawn out, the second hard disk drawer 40 is prevented from being drawn out by the first stopper 307. Similarly, when the second hard disk drawer 40 is drawn out, the first hard disk drawer 20 is prevented from being drawn out.

When the first hard disk drawer 20 is pushed into the housing 10, after the first resisting element 203 of the first hard disk drawer 20 contacts the second arm 304, if the first hard disk drawer 20 goes on to be pushed in, the second arm 304 will rotate around the axis 50 using the force generated by the push of the first hard disk drawer 20. The first arm 303 also rotates around the axis 50 make the second stopper 308 unengaged the first resisting element 203.

In the present embodiment, only two hard disk drawers are used, but in other embodiments, more than two hard disk drawers can be set in the housing 10. The scissor structure 30 can be set between every two hard disk drawers. Thus, only a part of the hard disk drawers can be drawn out from the housing 10 at the same time.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. A computer chassis comprising:
   a housing;
   an elastic element mounted in the housing and comprising two free ends;
   a scissor structure fixed to the housing, comprising a first arm, a second arm, a third arm, and a fourth arm, wherein the first arm and the second arm are an integral structure, the third arm and the fourth arm are an integral structure, the first arm and the second arm, and the third arm and the fourth arm are capable of rotating around an axis fixed in the housing, a free end of the first arm defines a first stopper, a free end of the third arm defines a second stopper, a free end of the fourth arm and a free end of the second arm are connected to the two free ends of the elastic element respectively; and
   two hard disk drawers slidably received in the housing and capable of being drawn out from the housing, the scissor structure being set between the two hard disk drawers, each of the two hard disk drawers comprising a resisting element;

wherein when both of the two hard disk drawers are not drawn out, the fourth arm and the second arm of the scissor structure set between the two hard disk drawers are sandwiched between the resisting elements of the two hard disk drawers, causing the elastic element to be deformed, the first stopper and the second stopper do not contact with the resisting elements of the two hard disk drawers, respectively, and when one of the two hard disk drawers is drawn out, the resisting element of the hard disk drawer being drawn out moves to cause the second arm to rotate around the axis under an elastic force generated by the elastic element, the first arm also rotates around the axis to make the first stopper engage with the resisting element of the other hard disk drawer and prevent the other hard disk drawer from being drawn out.

2. The computer chassis as described in claim 1, wherein when the drawn out hard disk drawer is being pushed into the housing, the resisting element of the drawn out hard disk drawer push and rotate the second arm around the axis to deform the elastic element and disengage the first stopper from the resisting element of the other hard disk drawer.

3. The computer chassis as described in claim 1, wherein the housing further comprises two protrusions, the two protrusions locate outside of the second arm and the fourth arm respectively to limit the movement of the second arm and the fourth arm.

4. The computer chassis as described in claim 1, wherein the resisting element of each of the two hard disk drawers protrudes from a body of each of the two hard disk drawers.

5. The computer chassis as described in claim 1, wherein the scissor structure is fixed to the housing at the position where the axis locates.

6. The computer chassis as described in claim 1, wherein the elastic element is a torsion spring.

* * * * *